2 Sheets--Sheet 1.

N. JACKSON.
Vehicle Spring Equalizer.

No. 160,678. Patented March 9, 1875.

Attest:
Jas. K. Jenkins
John F. Trott

Inventor:
Noble Jackson

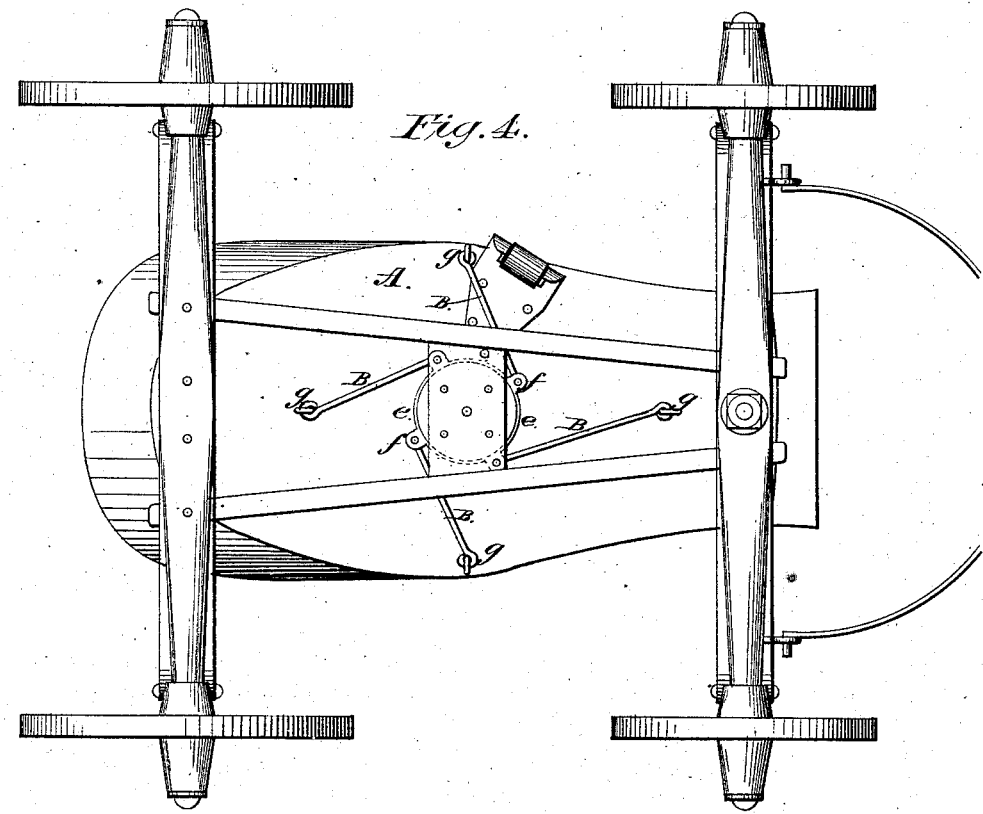

UNITED STATES PATENT OFFICE.

NOBLE JACKSON, OF HIGGINSVILLE, NEW YORK.

IMPROVEMENT IN VEHICLE-SPRING EQUALIZERS.

Specification forming part of Letters Patent No. 160,678, dated March 9, 1875; application filed September 9, 1874.

*To all whom it may concern:*

Be it known that I, NOBLE JACKSON, of Higginsville, county of Oneida, State of New York, have invented certain new and useful improvements to be used on vehicles having elliptic springs; and I do declare the following to be a full and clear description of the same.

My invention is designed to prevent vehicles having elliptic springs from pitching forward and rearward or sidewise while under motion, and to prevent the breaking of the springs by overloading and sudden pitches of the body, by the combination therewith of an equalizing device consisting of a wheel or disk pivoted upon the reach or reaches, a metal bearing-bed and stay-guides therefor, and a series of oblique rods uniting said wheel or disk with the body of the vehicle, whereby the latter will be braced in all directions by the yielding of the rods, and the disk firmly supported upon its bed, and all strain upon the pivot relieved by the stay-guides upon and between which the disk is centered.

Figure 1:
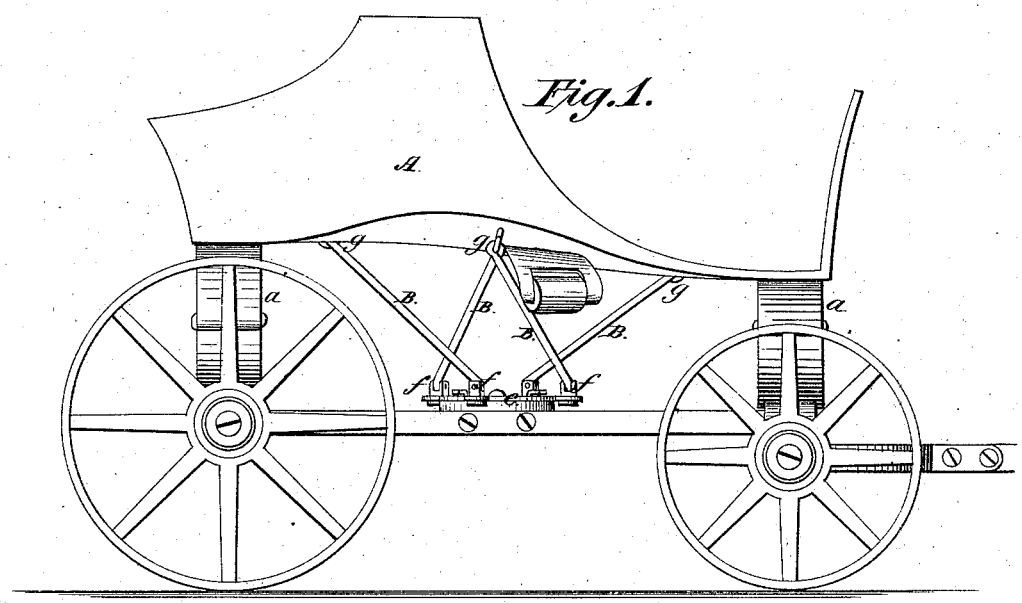
Figure 2:
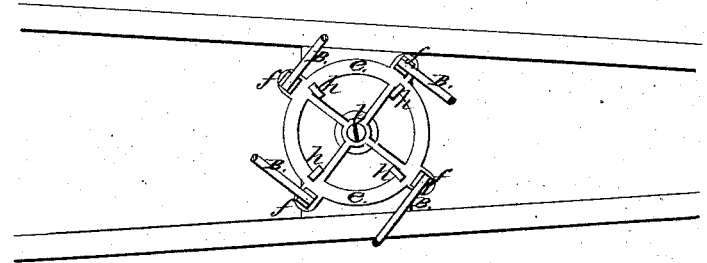
Figure 3:
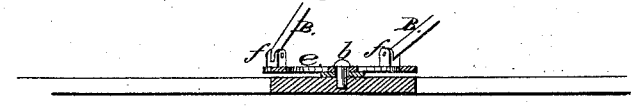

In the accompanying drawings, Figure 1 represents a side elevation of a vehicle embracing my invention; Fig. 2, a top view of the pivoted wheel or disk and its oblique connecting-rods; Fig. 3, a vertical section of the same; and Fig. 4, a bottom view of the vehicle and equalizing device.

The vehicle is of the usual construction, in which the body A is mounted upon elliptical springs $a\ a$; and upon the reach or reaches, about midway the length thereof, I secure, by a central bolt, $b$, a wheel or disk, $e$, so as to be capable of horizontal movement thereon, said wheel being additionally secured by three or four guards, $h$, overlapping the rim to hold it against vertical or side thrusts. To the circumference of this wheel or disk I secure, by strong joints $f$, rods B, rising therefrom in oblique positions to the body, and connecting with the under side of said body by joints $g$, the said rods inclining in the same direction, so as to form a kind of spiral web.

As the body rises and falls upon the springs, the rods B, pressing obliquely in the same direction upon the circumference of the wheel or disk, will cause the latter to turn upon its pivot $b$, and carry the ends of the rods connected therewith in the same direction, and thus form a central skeleton-frame, which braces the body in every direction, and relieves the springs from all sudden thrusts and danger of being broken by effectually equalizing the movements of the body.

The angles of the rods may be varied according to the weight of the vehicle. The downward movement of the body depresses and lessens the angles of the rods B by the turning of the disk, and this action of the rods causes each one to act upon said disk like a push-bar, the joints of the rods being such as to cause their upper ends to rise and fall freely with the action of the springs, without producing any binding effect upon the pivoted wheel or disk.

I am aware that a brace device for vehicle-springs has been used, in which a pivoted cross is connected by oblique rods to the body, so that when the part of the latter to which any one of said rods is united, the thrust of such rod tends to limit the oscillation of the body; whereas, by my improvement, the oscillations of the body are such as to render the action of the springs entirely free, and the equalizing-wheel is itself so braced by guide-stays as to relieve its center pivot of all strain.

I claim—

The equalizing device for vehicles, consisting of the reach wheel or disk $e$, having a metal bearing-bed and stay-guides $h$, and the oblique rods B, connecting the latter with the body for joint action with the springs, substantially as set forth.

NOBLE JACKSON.

Attest:
JAS. H. JENKINS,
JOHN F. TUTTLE.